(No Model.)

H. T. KNIGHT.
UNIVERSAL STEAM JOINT.

No. 440,864. Patented Nov. 18, 1890.

Witnesses:

Inventor,
Henry T. Knight
By Dewey & Co.
att'ys

UNITED STATES PATENT OFFICE.

HENRY T. KNIGHT, OF SOUTH RIVERSIDE, CALIFORNIA.

UNIVERSAL STEAM-JOINT.

SPECIFICATION forming part of Letters Patent No. 440,864, dated November 18, 1890.

Application filed July 1, 1890. Serial No. 357,396. (No model.)

*To all whom it may concern:*

Be it known that I, HENRY T. KNIGHT, a citizen of the United States, residing at South Riverside, San Bernardino county, State of California, have invented an Improvement in Universal Steam-Joints; and I hereby declare the following to be a full, clear, and exact description of the same.

My invention relates to a novel joint for pipes, which is especially applicable for the transmission of steam or fluid under pressure where it is necessary to change the direction from time to time.

It consists in certain details of construction, which will be more fully explained by reference to the accompanying drawings, in which—

Figure 1:
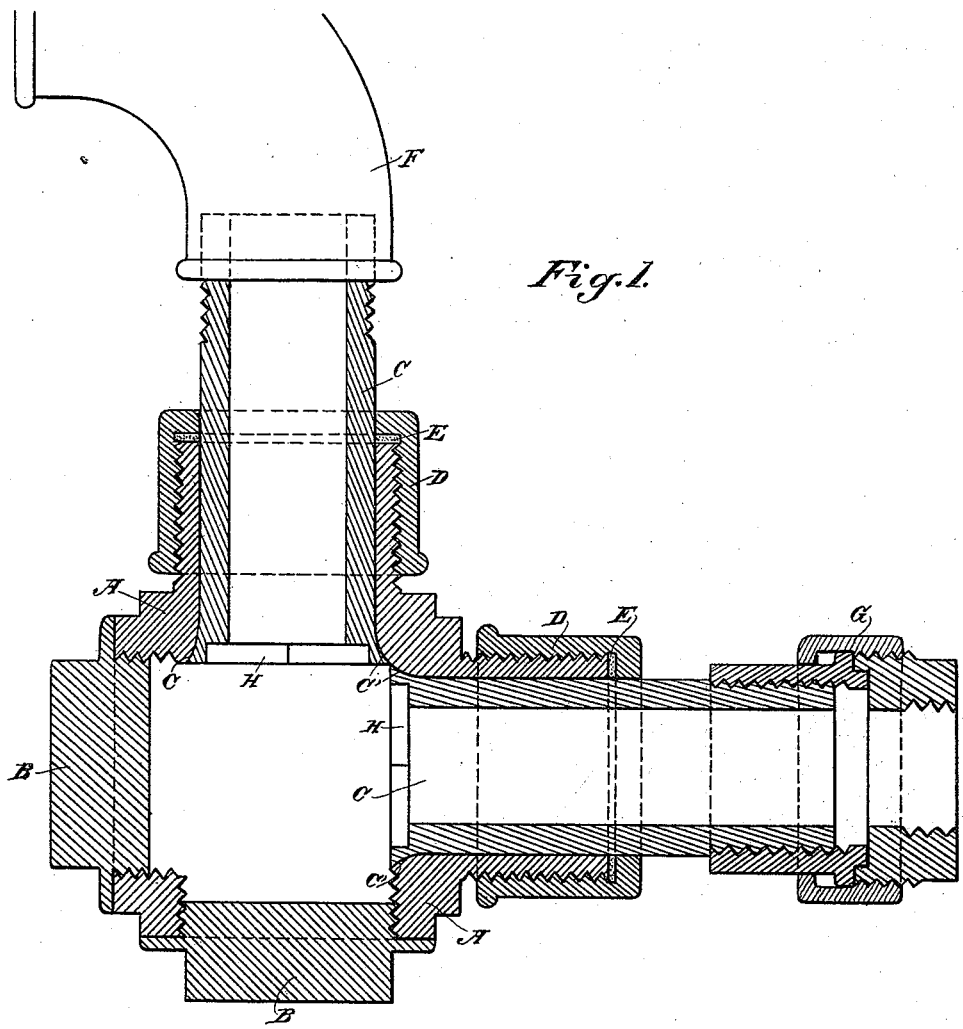
Figure 2:
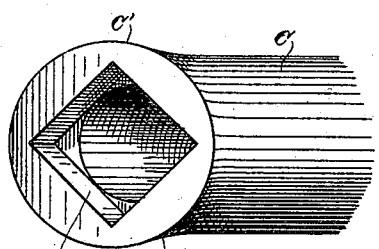

Figure 1 is a sectional view of the device. Fig. 2 is a view of one end of one of the coupling-sleeves.

A is the main portion or body of my coupling, having openings on four sides, as shown. Two of these openings at right angles with each other are shown as closed with screw-caps B, each of which is in line with one of the meeting pipes which form the coupling, and when these caps are removed they allow easy access to the coupling. The other two openings in the body A are adapted to receive the sleeves C C. The inner ends of these openings are beveled or expanded, as shown, and the corresponding ends of the sleeves C are made conical or expanded, as shown at C', so that they may fit into the corresponding conical seats and make tight joints, while they are allowed to rotate freely about their axes.

D D are caps which screw down over the ends of the extensions through which the sleeves C pass, and E E are packing-rings of any suitable material resting upon the ends of these extensions, so that when the caps D are screwed upon them they will make tight joints about the sleeves C and prevent any leakage at this point.

Upon the ends of the sleeves C are formed screw-threads, to which may be attached elbows or T-couplings, as shown at F, or couplings of any other suitable variety or style, as shown at G.

The sleeves C are introduced through the body A by removing the caps B, and each of these sleeves has a square opening formed in the inner end, as shown at H, so that a correspondingly-shaped tool may be introduced to hold the sleeve stationary while the coupling which is to be used is being screwed upon the outer end.

It will be manifest that after the device has been put together and the caps B screwed down in place a clear passage will be made through the sleeves C and the intermediate body A, through which steam, air under pressure, or any other fluid may readily flow, and by reason of the swiveling of the sleeves C within their sockets the connecting-pipes may be turned in any suitable or desired direction.

This coupling is especially useful in quarries and places where steam or air pressure drills are employed, and where the engines are frequently moved from one place to another, while the boiler remains in one position.

By the use of these couplings different lengths of pipe may be coupled up and turned to any desired direction, so as to reach the engine or drill, and these couplings, while allowing the pipes to be thus turned, will make tight joints at all times.

Hitherto it has been customary to use considerable lengths of hose, extending as much as from sixty to eighty feet, and this hose, which is somewhat expensive, will be burned out and spoiled by the hot steam in the space of two or three weeks, thus necessitating constant and expensive renewals, which my invention entirely avoids.

Having thus described my invention, what I claim as new, and desire to secure by Letters Patent, is—

A universal coupling consisting of the body A, having four openings, two of which are closed by screw-caps, while the remaining two openings have their inner ends beveled or expanded, the rotary sleeves C, at right angles with each other and their inner ends expanded and fitted in the expanded ends of the openings, the screw-caps D, fitted to the extended ends of the body A, and the packing-rings within the screw-caps and fitting against the ends of the extensions, substantially as herein described.

In witness whereof I have hereunto set my hand.

HENRY T. KNIGHT.

Witnesses:
S. H. NOURSE,
H. C. LEE.